United States Patent [19]

Mair

[11] 4,106,803
[45] Aug. 15, 1978

[54] MOLDING ATTACHMENT FOR VEHICLE BODY

[75] Inventor: Alex C. Mair, Bloomfield Hills, Mich.

[73] Assignee: General Motors Corporation, Detroit, Mich.

[21] Appl. No.: 808,056

[22] Filed: Jun. 20, 1977

[51] Int. Cl.² .............................................. B60R 13/04
[52] U.S. Cl. ................................... 293/62; 293/71 R; 293/DIG. 4
[58] Field of Search .......... 293/60, 62, 71 R, DIG. 4; 114/219; 267/140, 141

[56] References Cited

U.S. PATENT DOCUMENTS

| 3,013,516 | 12/1961 | Norman | 114/219 |
| 3,572,798 | 3/1971 | Kunevicius | 293/71 R X |
| 3,669,484 | 6/1972 | Bernitz | 293/71 R |
| 3,841,044 | 10/1974 | Brown et al. | 293/71 R X |

Primary Examiner—Trygve M. Blix
Assistant Examiner—Sherman D. Basinger
Attorney, Agent, or Firm—Charles E. Leahy

[57] ABSTRACT

Attachment of an adhesive-backed molding on a vehicle body panel includes studs welded to the panel and mating bores provided in the molding. The studs are outwardly inclined relative one another. The bores in the molding have an angle of inclination generally equal to the inclination of the studs. The resilient molding is stretched somewhat to effect engagement of the molding over the studs. The tension in the resilient molding causes the molding to ride down the inclined studs and wedge the molding and adhesive against the vehicle body panel to provide a mechanical connection and adhesion promoting engagement therebetween.

2 Claims, 3 Drawing Figures

MOLDING ATTACHMENT FOR VEHICLE BODY

The invention relates to a body side molding and more particularly to an improved attachment of an adhesive-backed molding strip to a vehicle body panel.

It is well known to secure a strip of molding to such vehicle body panels such as the front fenders, door panels, and rear quarter panels, as protection against damage from the opening of doors of adjacent parked cars. Such moldings are conventionally formed of a resilient rubber or plastic material and attached to the vehicle body panel by a two-sided adhesive tape or other adhesive bond.

It is also known that the aforedescribed adhesive attachment is not always adequate to maintain the molding attachment during severe use and environmental conditions. For example, it is known that the extremes of high and low temperature experienced by motor vehicles causes thermal expansion and contraction of both the sheet metal body panel and the molding strip which stresses the adhesive bond therebetween. It is also believed that the adhesive bond is subject to attack by migration of plasticizer from the resilient molding. The freezing and thawing of water entrapped in the molding also contributes to deterioration of the adhesive bond.

It has been observed that these conditions adverse to adhesive bonding manifest themselves by separation of the molding which frequently begins at the terminus of the strip and proceeds down the length of the molding.

The present invention provides a positive mechanical attachment of the ends of an adhesively secured molding strip.

According to the present invention, a stud is welded to the vehicle body panel adjacent each end of the molding strip. Mating bores are provided in the molding strip for receiving the studs of the body panel. The studs are outwardly inclined relative one another. The bores in the molding strip have an angle of inclination generally equal to the inclination of the studs. The resilient molding is stretched somewhat to effect engagement of the molding over the studs. The tension in the resilient strip causes the strip to ride down the inclined studs and wedge the molding and adhesive against the vehicle body panel. Accordingly, the studs support the ends of the molding in the vertical direction and also provide a wedging affect by which the base of the molding is retained against the body panel to hold the molding against the vehicle body panel and maintain pressure on the adhesive bond.

One feature, object and advantage of the invention is the provision of a positive end attachment for mounting an adhesive-backed molding on a vehicle body panel.

Another feature, object and advantage of the invention resides in the provision of spaced apart studs on a vehicle body panel for mating with bores provided in the body of an adhesive-backed vehicle body molding.

Another feature, object and advantage of the invention is the provision of angularly inclined studs projecting from a vehicle body panel for engagement within mating bores of a resilient molding strip so that tension in the molding causes impalement of the molding on the studs to wedge the molding into adhesion enhancing engagement with the vehicle body.

These and other features, objects and advantages of the invention will become apparent upon consideration of the specification and the appended drawings in which.

Figure 1:
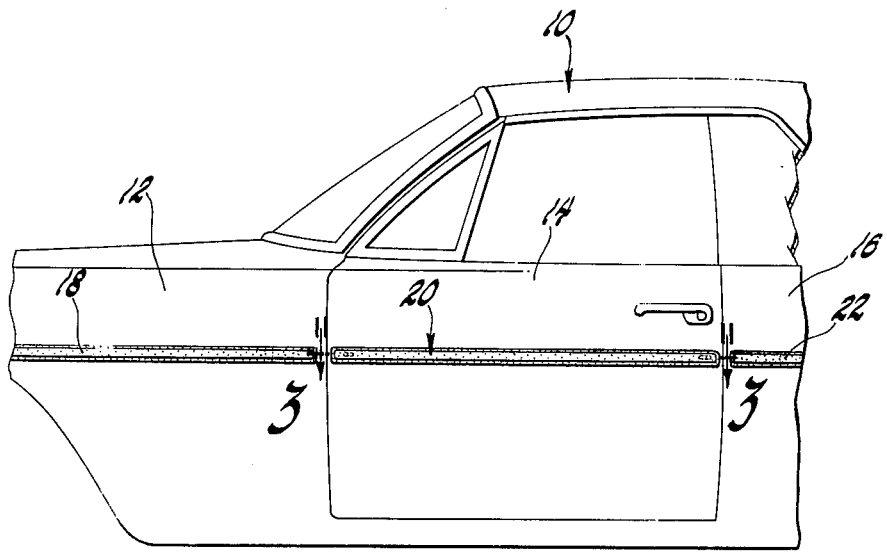
FIG. 1 is a side elevation view of a vehicle body having a molding attachment according to the invention.

Referring now to FIG. 1, it is seen that a vehicle body generally indicated at 10 includes a front fender 12, door panel 14 and rear quarter panel 16. Resilient moldings 18, 20, and 22 are respectively attached to the front fender 12, door panel 14, and rear quarter panel 16. The resilient moldings may be formed of any commercially available plastic or rubber-like resilient material appropriate for such use. The body side moldings protect the associated body panels from impact by the carelessly opened door of an adjacently parked motor vehicle.

Figure 2:
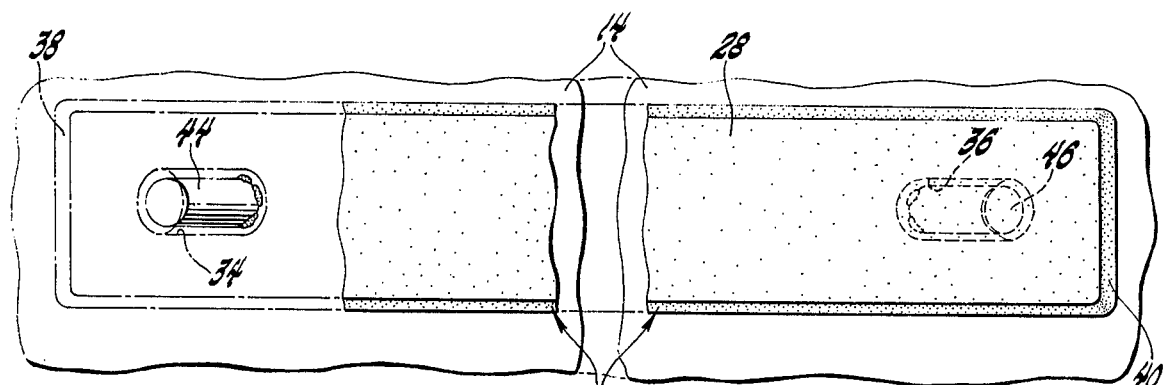
FIG. 2 is an enlarged fragmentary view of FIG. 1 having parts broken away.
Figure 3:
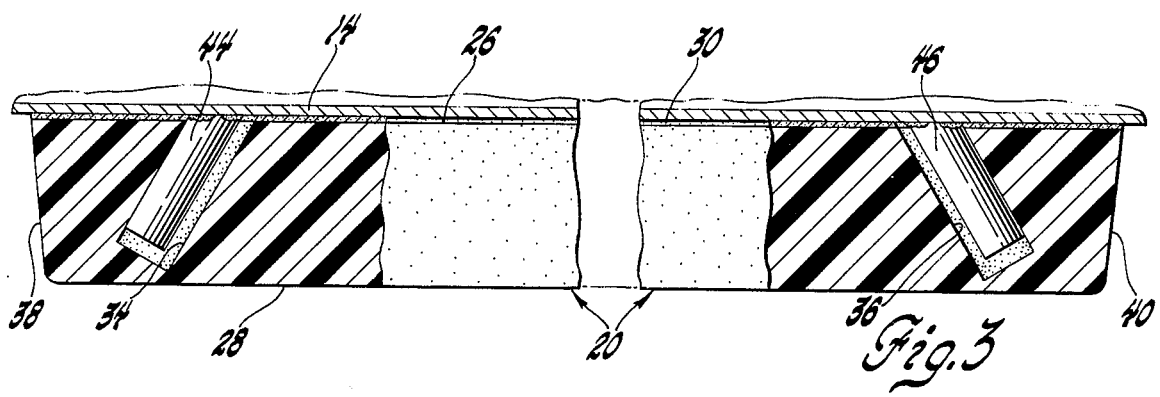
FIG. 3 is a sectional view taken in the direction of arrows 3—3 of FIG. 1.

Referring to FIGS. 2 and 3, it is seen that the resilient molding 20 is an elongated rectangular strip having a base wall 26 disposed adjacent the door panel 14 and an outer impact receiving surface 28. The resilient molding 20 is attached to the door panel 14 by a strip of two-sided adhesive tape 30 which is preferably applied to the back of the molding and protected from inadvertent adhesion during shipment and handling by a protective paper covering, not shown, which is removed just prior to installation.

A pair of bores 34 and 36 are provided in the resilient molding 20 adjacent the ends 38 and 40 thereof. The bores 34 and 36 angle outwardly from one another and stop short of the impact receiving surface 28 of the resilient molding 20. The bores 34 and 36 may be drilled into the body of the molding 20 or may be molded therein.

A pair of studs 44 and 46 are welded to the door panel 14 and angle outwardly from one another at an angle generally equal to the angle of inclination of the molding bores 34 and 36. The relative spacing between these molding bores 34 and 36 and the studs 44 and 46 is such that the molding 20 is stretched longitudinally somewhat in order to effect engagement of the molding over the studs. This assembly operation is most conveniently performed by hooking the one end of the molding over its associated stud and then pulling the molding from the free end to impale the free end over its associated stud. As the stretching effort is relieved from the molding, the molding contracts and rides down the studs into contact with the door panel 20. The molding is preferably rolled or otherwise pressured along its full length to promote adhesion by the two-sided adhesive tape 30.

The spacing of the studs 44 and 46 relative the molding bores 34 and 36 is preferably such that the body of the molding 20 remains in a state of tension even after it is applied to the door panel as shown in FIG. 3. Accordingly, the interaction between the molding bores 34 and 36 and the angularly inclined studs 44 and 46 causes the outer ends of the moldings to be wedged between the pins and the door panel 14 to provide a mechanical connection between the molding 20 and door panel 14 as well as maintain the molding ends in adhesion promoting engagement with the two-sided adhesive tape 30 and the door panel 14.

Thus, it is seen that the provision of outwardly angled studs on a vehicle body panel cooperate with mating bores provided in an adhesive-backed body side molding to promote securement of the molding to the vehicle body.

The embodiments of the invention in which an exclusive property or privilege is claimed are defined as follows:

1. In a vehicle body, the combination comprising:
a vehicle body panel having an accessible outer face and an inaccessible inner face;
a molding strip of yieldable resilient material for attachment to the body panel to protect the body panel;
adhesive means acting between the molding strip and the body panel;
a pair of spaced apart circular cylindrical studs of uniform cross section projecting from the surface of the body panel and being inclined away from one another;
a pair of laterally spaced circular cylindrical bores of uniform cross section provided in the molding strip and having an angle of inclination equal to the angle of inclination of the studs projecting from the body panel, said molding strip being attached to the body panel by longitudinally stretching the molding strip to engage the molding strip over the projecting studs with the studs captured within the bores.

2. In a vehicle body, the combination comprising:
a vehicle body panel having an accessible outer face and an inaccessible inner face;
a molding strip of yieldable resilient material for attachment to the body panel to protect the body panel;
adhesive means acting between the strip means and the body panel;
a pair of laterally spaced circular cylindrical studs of uniform cross section projecting from the surface of the body panel and being inclined away from one another;
a pair of laterally spaced circular cylindrical bores of uniform cross section provided in the molding strip and having an angle of inclination equal to the angle of inclination of the studs and a lateral spacing less than the lateral spacing of the studs whereby upon engagement of the molding strip over the studs tension remains in the molding strip to pull the end of the strips down the angled studs and maintain the ends of the strip in adhesive securement with the body panel.

* * * * *